US010692039B2

(12) United States Patent
Chowdhary et al.

(10) Patent No.: US 10,692,039 B2
(45) Date of Patent: Jun. 23, 2020

(54) CARGO LOGISTICS DISPATCH SERVICE WITH INTEGRATED PRICING AND SCHEDULING

(71) Applicant: International Business Machines Corporation, Armonk, NY (US)

(72) Inventors: Pawan R. Chowdhary, San Jose, CA (US); Markus R. Ettl, Ossining, NY (US); Zhenyu Hu, Singapore (SG); Roger D. Lederman, Briarcliff Manor, NY (US); Zhengliang Xue, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 606 days.

(21) Appl. No.: 15/270,364

(22) Filed: Sep. 20, 2016

(65) Prior Publication Data
US 2018/0082253 A1    Mar. 22, 2018

(51) Int. Cl.
*G06Q 10/08* (2012.01)
*G06Q 10/10* (2012.01)

(52) U.S. Cl.
CPC ... *G06Q 10/08345* (2013.01); *G06Q 10/1095* (2013.01)

(58) Field of Classification Search
None
See application file for complete search history.

(56) References Cited

U.S. PATENT DOCUMENTS

| 6,321,207 B1* | 11/2001 | Ye ................... G06Q 10/06315 705/7.25 |
| 7,092,894 B1 | 8/2006 | Crone |
| 7,363,271 B2 | 4/2008 | Morimoto |
| 8,019,617 B2 | 9/2011 | Kocis et al. |
| 8,700,500 B2 | 4/2014 | Podgurny et al. |
| 8,756,090 B2 | 6/2014 | Benda et al. |
| 2002/0019759 A1* | 2/2002 | Arunapuram ......... G06Q 10/08 705/7.26 |
| 2003/0163332 A1 | 8/2003 | Podgurny et al. |
| 2004/0181370 A1* | 9/2004 | Froehlich ............. G06F 9/5083 702/187 |

(Continued)

FOREIGN PATENT DOCUMENTS

| JP | 2004220234 A | 8/2004 |
| WO | 2001008024 A2 | 2/2001 |

(Continued)

OTHER PUBLICATIONS

Anonymous, "High Performance Computing based system for optimization and analyses in the LNG business", an IP.com Prior Art Database technical disclosure, IPCOM000234153D, Jan. 14, 2014, https://ip.com/IPCOM/000234153 (Year: 2014).*

*Primary Examiner* — Matthew S Gart
*Assistant Examiner* — Camille M Galloway
(74) *Attorney, Agent, or Firm* — Scully, Scott, Murphy & Presser, P.C.; Joseph Petrokaitis

(57) ABSTRACT

System and method that improves cargo logistics may be presented. For instance, shipping capacity in cargo logistics may be best utilized based on providing pricing and scheduling solutions that are jointly optimized and prices differentiated based on flexibility of service request. Scheduled service and pricing may be transmitted as a signal to control execution of the cargo logistics.

19 Claims, 5 Drawing Sheets

(56) References Cited

U.S. PATENT DOCUMENTS

| | | | |
|---|---|---|---|
| 2005/0222853 A1* | 10/2005 | Black | G06Q 10/08 705/331 |
| 2013/0159059 A1 | 6/2013 | Malov | |
| 2013/0159208 A1 | 6/2013 | Song et al. | |
| 2014/0095224 A1 | 4/2014 | Vemitsky et al. | |
| 2014/0214602 A1 | 7/2014 | Konicek et al. | |
| 2014/0214603 A1 | 7/2014 | Wenger et al. | |
| 2016/0042321 A1 | 2/2016 | Held | |

FOREIGN PATENT DOCUMENTS

| | | |
|---|---|---|
| WO | 2012163595 A1 | 12/2012 |
| WO | 2014178055 A1 | 11/2014 |
| WO | 2015019340 A1 | 2/2015 |

* cited by examiner

CARGO LOGISTICS DISPATCH SERVICE WITH INTEGRATED PRICING AND SCHEDULING

BACKGROUND

The present application relates generally to computers and computer applications, and more particularly to cargo logistics. Aspects of cargo logistics management are dynamic and complex, and involve different facets. However, current methodologies do not take into consideration variables such as lead time and capacity scheduling when cargo transportation service is quoted. This behavior may lead to suboptimal transportation, scheduling as well as pricing.

BRIEF SUMMARY

A method and system for cargo logistics may be provided. The method, in one aspect, may include receiving a service request for transporting cargo. The method may also include determining a demand forecast that predicts a future demand for cargo services with confidence level. The method may also include, responsive to determining that the confidence level meets a threshold confidence level, executing a mixed integer program that jointly determines price and shipping schedule for transporting the cargo, based on inputs comprising the demand forecast, customer data, cargo characteristics, service request, network capacity and existing cargos to ship, the mixed integer program optimizing jointly the price and the shipping schedule. The method may also include, responsive to determining that the confidence level does not meet the threshold confidence level, executing a dynamic program that dynamically determines the price and the shipping schedule based on input comprising the demand forecast, the customer data, the cargo characteristics, the service request, the network capacity and the existing cargos to ship. The method may also include generating and transmitting a signal that dispatches the cargo for transportation according to the shipping schedule.

A system of providing cargo logistics, in one aspect, may include at least one hardware processor operable to receive a service request for transporting cargo. The at least one hardware processor may be further operable to determine a demand forecast that predicts a future demand for cargo services with a confidence level. Responsive to determining that the confidence level meets a threshold confidence level, the at least one hardware processor may be further operable to execute a mixed integer program that jointly determines price and shipping schedule for transporting the cargo, based on inputs comprising the demand forecast, customer data, cargo characteristics, service request, network capacity and existing cargos to ship, the mixed integer program optimizing jointly the price and the shipping schedule. Responsive to determining that the confidence level does not meet the threshold confidence level, the at least one hardware processor may be further operable to execute a dynamic program that dynamically determines the price and the shipping schedule based on input comprising the demand forecast, the customer data, the cargo characteristics, the service request, the network capacity and the existing cargos to ship. The at least one hardware processor may be further operable to generate and transmit a signal that dispatches the cargo for transportation according to the shipping schedule.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

System and method that improves cargo logistics may be presented. For instance, shipping capacity in cargo logistics may be best utilized based on providing pricing and scheduling solutions that are jointly optimized and prices differentiated based on flexibility of service request. Scheduled service and pricing may be transmitted as a signal to control execution of the cargo logistics.

Figure 1:
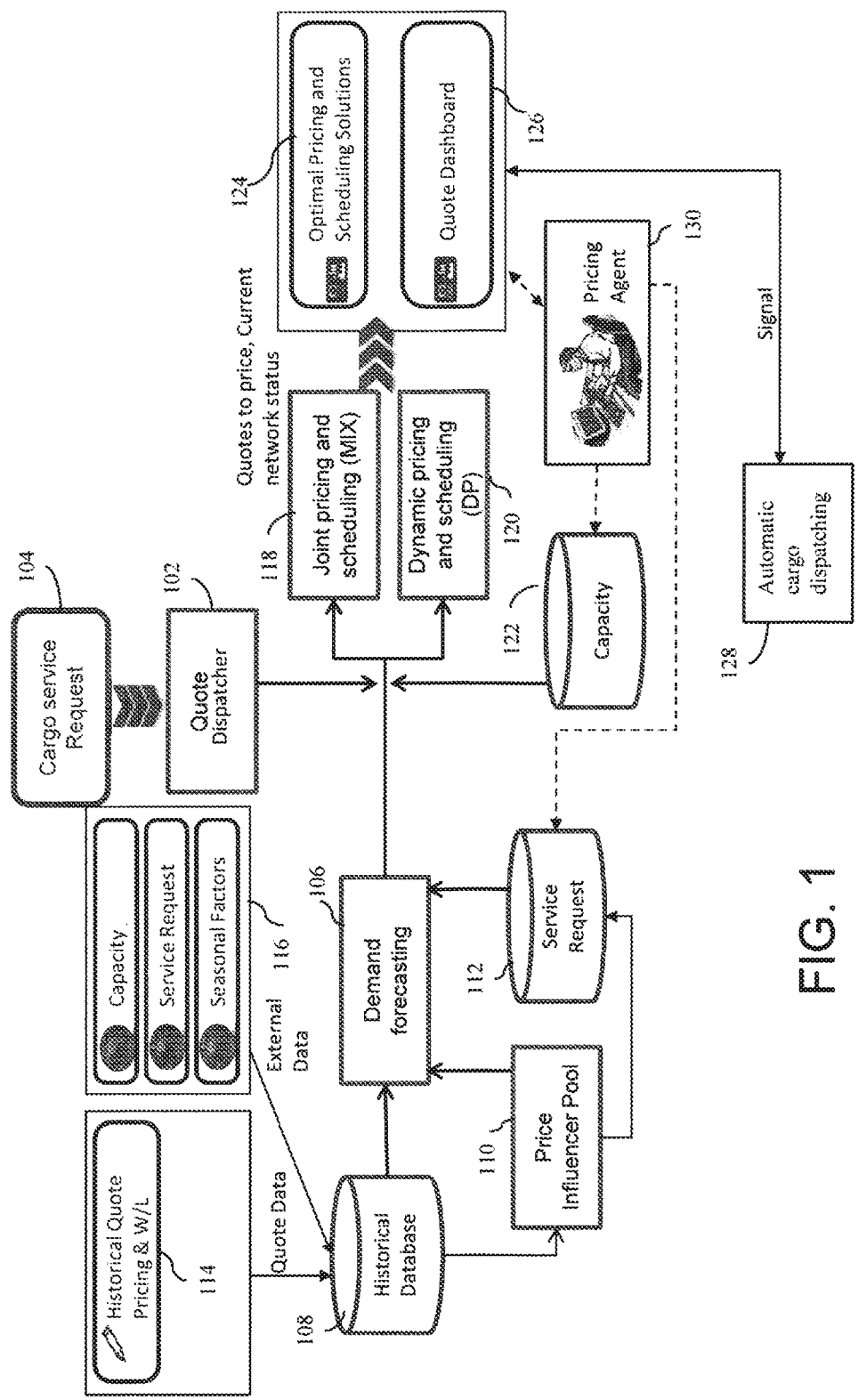
FIG. 1 is a diagram illustrating system architecture of a system that provides cargo logistics service in one embodiment of the present disclosure.

FIG. 1 is a diagram illustrating system architecture of a system that provides cargo logistics service in one embodiment of the present disclosure. A quote dispatcher 102 may run on one or more hardware processors and receive a cargo service request 104 to transport cargo, for example, via a user interface or an application programming interface (API). A cargo service request 104, for example, specifies the transportation routes, cargo characteristics and service requirements. The quote dispatcher 102 may receive a demand forecast for future cargo services computed or determined by a demand forecasting component 106. The demand forecasting component 106 executes on one or more hardware processors and computes or predicts future demand for cargo services with confidence level. In one aspect, the quote dispatcher may invoke the demand forecasting component 106.

In one embodiment, the demand forecasting component 106 predicts the demand for future cargo services based on historical database 108, price influencer pool 110 and service request data 112. An example model included in the demand forecasting component 106 may include a time series model that performs predictions with confidence values. Let $Q(t,l)$ be the demand quoted at a price $p(t,l)$ in period $t$ and ready to ship at period $l$, for $0 \leq l \leq L$. For example, $Q(t,l) = \Lambda_t \cdot q(t,l)$, where $\Lambda_t$ represents the volume of all potential clients in each period $t$, which can be learned by a time series model such as ARMA, and $q(t,l)$ represents the purchase probability of a client for cargos ready to ship in period $t+l$, at a quoted price $p(t,l)$. The purchase probability is a decreasing function of quoted price, in which a client has less likelihood to accept a higher quoted price in the RFQ process.

The historical database 108 may include historical quote data and also information as to which quotes were accepted or not accepted by customers (e.g., win/loss) 114. The historical database 108 may also include external data 116 such as capacity, service request and seasonal factors. The capacity may represent the available space (or weight) of a cargo carrier in a time period. The capacity leftover is equal to the capacity minus the inventory of cargos within the time period. In one embodiment, the service request in the external data 116 may include at least the following contents: 1) cargo characteristics, including weight, size, shape, and/or other characteristics; 2) transportation routes, including the origin and destination, intermediate stops, and the type of carriers such as airplane, train, trunk, and/or another carrier type; 3) service request, for example, including the ready to ship date, the latest ship date, shipping leadtime, special packing request and/or another request information. The seasonal factors represent the peak and idle time of the demand of cargo services.

Price influencer pool 110 may include, but not limited to, information such as weight, volume, leadtime, number of pieces, number of stops, historical win rates, consumer types, type of products, type of freights, competition, seasonality, and weekend effects. Price influencers may be correlated. For example, weight and number of pieces may be correlated; freighter and weekend may be correlated. In one embodiment, L-1 penalized method (LASSO) may be used to reduce correlation; p-value may be used to filter out statistically insignificant price influencers. Service request data 112 may include the ready to ship date, the latest ship date, shipping leadtime, special packing request and/or others. The request shows the time flexibility of logistics services, and is used in demand forecasting model and included in the pricing and scheduling optimization. The cargo service request at 104 shows a real time quote. The service requests shown at 112 are recorded for historical quotes.

The historical database 108 installs the records of historical quotes. Each record may at least include the transportation routes, cargo characteristics, and service request. A price influencer pool 110 contains these factors, which are used as inputs to the demand forecasting module 106.

The quote dispatcher 102 based on the demand forecasting component's demand forecast and confidence level associated with the prediction of the demand, invokes or executes an optimization function. If the confidence of demand forecast is high, the quote dispatcher 102 may invoke or execute a mixed integer program 118 to perform optimization and compute jointly the pricing and scheduling for the cargo service request. If the confidence of demand forecast is uncertain or not high, the quote dispatcher 102 may invoke or execute a dynamic program 120 to perform optimization and compute the pricing and scheduling for the cargo service request.

Whether the confidence is high or not may be determined based on comparing the confidence level with a defined threshold level. For instance, if the confidence level meets a threshold level, the mixed integer program 118 may be executed; if the confidence level does not meet the threshold level, the dynamic program 120 may be executed.

Input to the mixed integer program 118 also may include network capacity information stored in capacity database 122. For example, the capacity database 122 may store information or data specifying the cargo capacity such as available transportation vehicles in the network of routes.

The pricing and scheduling solution 124 determined by the mixed integer program 118 or the dynamic program 120 may be presented on a user interface, for example, a dashboard 126. In one embodiment, a signal comprising the scheduling may be transmitted to an automatic cargo dispatching system 128 to dispatch the cargo according to the determined schedule. In one aspect, the signal may be sent responsive to a user 130 accepting a computed pricing and scheduling solution.

Figure 2:
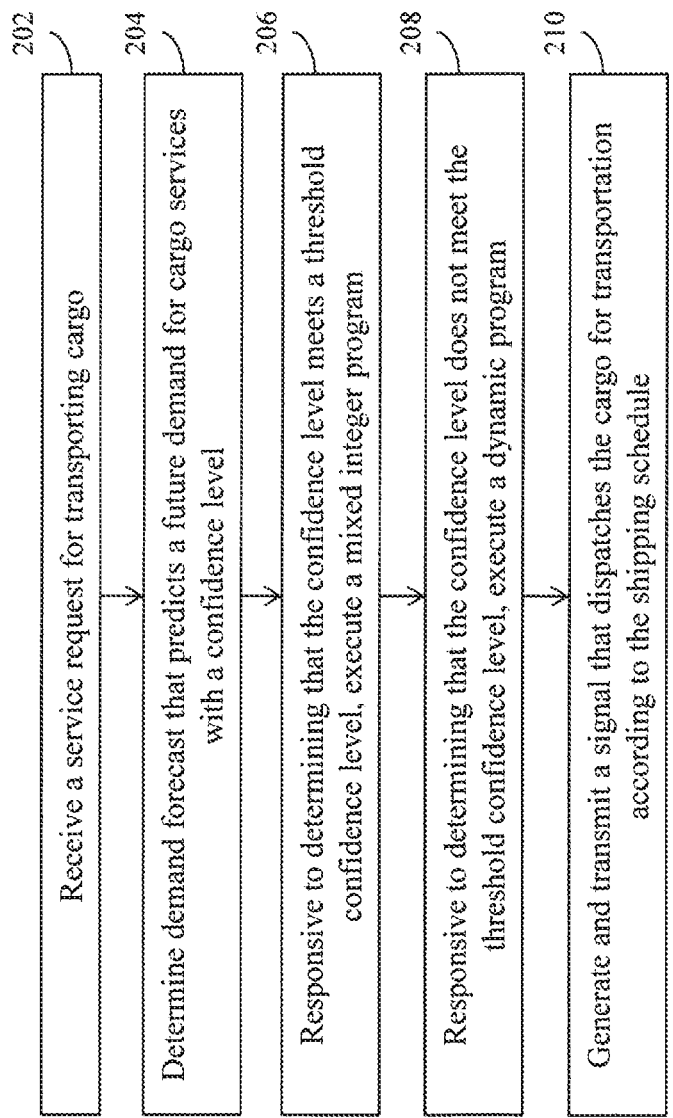
FIG. 2 is a flow diagram illustrating a method of providing cargo logistics service in one embodiment of the present disclosure.

FIG. 2 is a flow diagram illustrating a method of providing cargo logistics service in one embodiment of the present disclosure. At 202, a service request for transporting cargo is received. At 204, a demand forecast is determined or demand forecasting is performed that predicts a future demand for cargo services with confidence level. The confidence level may be compared with a threshold confidence level to determine whether the prediction is precise or predicted with high confidence. For example, the mean absolute percentage error (MAPE) or deviation less than 5% may indicate high confidence.

At 206, responsive to determining that the confidence level meets a threshold confidence level, a mixed integer program is executed that jointly determines price and shipping schedule for transporting the cargo. The mixed integer program may be executed based on inputs comprising the demand forecast, customer data, cargo characteristics, service request, network capacity and existing cargos to ship. The mixed integer program optimizes jointly the price and the shipping schedule.

The customer data may include, for example, company type of the customer, customer historical average win probability (e.g., probability the customer accepts quotes), customer loyalty, and/or others.

Cargo characteristics may include data such as the weight of the cargo, volume, density, and the number of pieces in the cargo.

Service request may specify requested lead time for quote, which represents the time interval between the quote date and ready to ship date, ready to ship date and latest ship date.

Network capacity may specify traffic information such as an original location (e.g., location A), destination location (e.g., location Z) and routing (e.g., location A→location B→location Z) between the original location and the destination location. Existing cargos to ship may specify cargos that are already accepted to be shipped.

At 208, responsive to determining that the confidence level does not meet the threshold confidence level, a dynamic program is executed. The dynamic program dynamically determines the price and the shipping schedule based on input comprising the demand forecast, the customer data, the cargo characteristics, the service request, the network capacity and the existing cargos to ship. The dynamic program performs pricing and scheduling for stochastic demand and/or no-show of cargo, and may consider factors that drive market fluctuation such as freight index. The dynamic program considers that inventory changes dynamically based on capacity scheduling policy and pricing strategy is contingent on inventory.

At 210, a signal is generated and transmitted that dispatches the cargo for transportation according to the shipping schedule. In one aspect, the determined price and the shipping schedule may be presented on a user interface. The generating of the signal may be performed responsive to receiving an acceptance of the price and the shipping schedule via the user interface.

In one embodiment, the mixed integer program includes the following parameters:

t: 1, . . . , T representing time index with planning horizon=T;

l: 0, . . . , L representing ready-to-ship date=t+l;

m: 0, . . . , M representing feasible ship time=t+l+m≤t+l+M, which is the latest date to ship;

n: 1, . . . , N representing index of price point;

$p_n(t,l)$: n:1, ..., N representing list prices, where $p_1(t,l) < p_1(t,l) < ... < p_N(t,l)$, and $p_N(t,l)$ is the stopping price corresponding to a zero demand, $q_N(t,l)=0$;

$q_n(t,l)$: n:1, ..., N representing demands corresponding to list prices, where $q_n(t,l)=f(p_n(t,l))$ is a demand function, and $q_N(t,l)=0$;

$x_n(t,l)$: 0-1 for pricing decision, where pricing decision=1 if $p_n(t,l)$ is applied to any quote at period t, ready to ship at period t+l;

$Q(t,l)=\Sigma_{1 \leq n \leq N} x_n(t,l) \cdot q_n(t,l)$ representing demand after pricing decision;

$y_m(t,l)$: 0-1 for allocation decision, where allocation decision=1 if demand $Q(t,l)$ is planned to ship at period t+l+m;

$d(t,l,m)=y_m(t,l) \cdot Q(t,l)$, representing demand associated with allocation decision;

$D(t)=\Sigma_{0 \leq m \leq M} \Sigma_{\tau+l+m=t} y_m(\tau,l) \cdot Q(\tau,l)$, representing total demand to ship at period t after allocation decisions;

c(t): representing unit shipping cost/transaction cost;

W(t): representing maximum capacity (e.g., weight or volume).

Objective function may be formulated as:

$$\text{Max}(x_n, y_m) \Sigma_{1 \leq t \leq T} \Sigma_{0 \leq l \leq L} \Sigma_{1 \leq n \leq N} x_n(t,l) \cdot (p_n(t,l) q_n(t,l)) - \Sigma_{1 \leq t \leq T} c(t) [\Sigma_{0 \leq m \leq M} \Sigma_{\tau+l+m=t} y_m(\tau,l) \cdot \Sigma_{1 \leq n \leq N} x_n(\tau,l) \cdot q_n(\tau,l)] \quad \text{Eq. (1)}$$

In the above objective function (Eq. (1)), the first term represents the total revenue from period 0 to period T, which is determined by the pricing decision $x_n(t,l)$ in each period t. If $x_n(t,l)=1$, the price is set at $p_n(t,l)$ for any item quoted at period t and ready to ship at period t+l. The corresponding demand is $q_n(t,l)$ at such price point. The total revenue is calculated by a sequence of pricing decisions for all the possible combinations of quoted time and ready to ship time, (t,l). The second term represents the total shipping cost for all the demands, which is decided by the scheduling decision $y_m(\tau,l)$ for any quote in period T and ready to ship in period $\tau+l$. If $y_m(\tau,l)=1$, such quote is scheduled to ship in period $\tau+l+m$, assuming any item must be shipped within M+1 periods after it is ready. Note, $t=\tau+l+m$, $\tau \leq t$, because for any item scheduled to ship in period t must be quoted in an earlier period, say $\tau$. The quoted amount is equal to $\Sigma_{1 \leq n \leq N} x_n(\tau,l) \cdot q_n(\tau,l)$, depending on the pricing decision $x_n(\tau,l)$, which will be ready in period $\tau+l$, and scheduled to ship in period $\tau+l+m$, at a unit cost of c ($\tau+l+m$). After a scheduling decision, $y_m(\tau,l)$, any quote ($\tau,l$) satisfying $\tau+l+m=t$, for $\tau \leq t$, $0 \leq l \leq L$, will be shipped in period t at a unit cost c(t), under a capacity constraint W(t).

The decision variables in the objective function include: $x_n(t,l)$, and $y_m(t,l)$, where $x_n(t,l)$ is a 0-1 variable that decides whether the n-th list price will be applied to the quotes at time period t for items ready to ship in period t+l, and $y_m(t,l)$ is a 0-1 variable that determines whether such demand after pricing decision will be allocated to ship at time period t+l+m. To represent the demand after allocation decision, let d(t,l,m) be the demand quoted at time period t, ready at period t+l, and scheduled to ship at period t+l+m.

The following shows the problem formulation in one embodiment of the present disclosure.

$$\max_{x_n(t,l), y_m(t,l)} \sum_{t=1}^{T} \sum_{l=0}^{L} \sum_{n=1}^{N} p_n q_n x_n(t,l) - \quad \text{Eq. (2)}$$

-continued $$\sum_{t=1}^{T} c(t) \left[ \sum_{\tau+l+m=t} d(\tau, l, m) \right]$$

The joint pricing and scheduling problem can be formulated by a mixed integer program. Without loss of generality, assume there are N list prices such as $p_1, ..., p_N$, and N possible quantities corresponding to these list prices, for any quote at period t and ready to ship at period t+l. Then the objective function can be formulated as in Eq. (2), where the first term represents the revenue determined by the pricing decision, whereas the second term represents the shipping cost jointly determined by the pricing and allocation decisions.

In one embodiment the formulation is solved subject to the following constraints:

$$\text{s.t.} \sum_{n=1}^{N} x_n(t, l) = 1,$$

the pricing constraint specifying that only one of the N list prices will be selected in each period t, for those ready to ship at t+l;

$$d(t, l, m) = y_m(t, l) \left[ \sum_{n=1}^{N} q_n x_n(t, l) \right],$$

specifying that the shipping demand after scheduling is jointly determined by the pricing and allocation decisions;

$$\sum_{m=0}^{M} y_m(t, l) = 1,$$

the allocation constraint specifying only one of the M+1 time slots will be selected after the items ready to ship;

$$\sum_{\tau+l+m=t} d(\tau, l, m) \leq W(t),$$

the capacity constraint specifying that the total shipping demands cannot exceed the available capacity W(t) in each period t;

$x_n(t,l), y_m(t,l) \in \{0,1\}$, the pricing and scheduling decision variables are 0-1 integers, which specify what list price to select and what shipping time slot to allocate.

The following describes variable transformation and problem reformulation of the mixed integer program in one embodiment of the present disclosure, where a joint pricing and allocation decision variable $z_{mn}(\tau,l)$ is introduced to replace the allocation variable $y_m(\tau,l)$.

$$\max_{x_n(t,l), z_{mn}(t,l)} \sum_{t=1}^{T} \sum_{l=0}^{L} \sum_{n=1}^{N} p_n q_n x_n(t, l) - \sum_{t=1}^{T} c(t) \left[ \sum_{\tau+l+m=t} \sum_{n=1}^{N} q_n z_{mn}(\tau, l) \right],$$

subject to the following constraints:

$$\text{s.t.} \sum_{n=1}^{N} x_n(t, l) = 1,$$

which specifies that only one of N list prices is selected;

$$\Sigma_{m=0}^{M} z_{mn}(t,l) = x_n(t,l), \rightarrow \Sigma_{m=0}^{M} y_m(t,l) = 1,$$

if $x_n(t,l)=1$, the constraint forces scheduling a shipping time for any realized demand $q_n$, as long as the price is set at $p_n$ at period t. On the other hand, the constraint does not allocate any time;

$$\sum_{\tau+l+m=t} \sum_{n=1}^{N} q_n z_{mn}(\tau, l) \leq W(t),$$

which specifies that the total shipping quantity allocated to period t cannot exceed the available capacity W(t) in that period;

$$x_n(t,l), z_{mn}(t,l) \in \{0,1\},$$

which specifies that the joint pricing and allocation decision variable, $z_{mn}(t,l)$ must be 0-1 integer.

Figure 3:
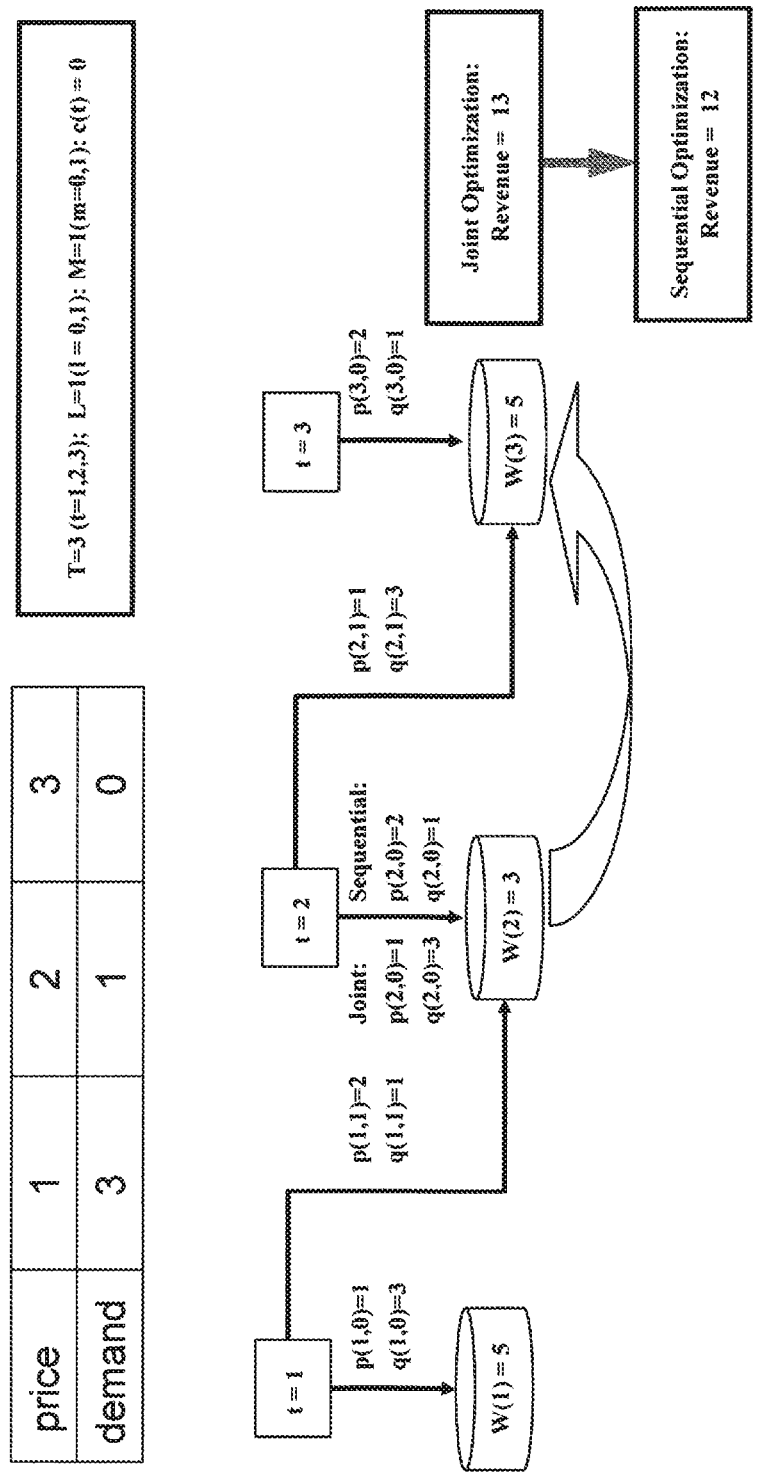
FIG. 3 shows an example of demand pulling effect in one embodiment of the present disclosure.

FIG. 3 shows an example of demand pulling effect in one embodiment of the present disclosure. In this example, there are three list prices $p_1=1$, $p_2=2$, $p_3=3$. The prices have corresponding quoted demands, $q_1=3$, $q_2=1$, $q_3=0$, respectively as shown. The planning time horizon includes 3 periods, t=1, 2, 3. Here, L=1, thus l=0 or 1. M=1, thus m=0 or 1, allowing cargo to be shipped as soon as it is ready to ship or be postponed to the next period. There are 2 $q_n$ items quoted in period t, in which $q_n$ items are ready to ship in the same period (l=0), and another $q_n$ items will be ready to ship in period t+1(l=1). M=1, thus any item must be shipped within 2 periods, after it is ready. In this example, the capacities are W(1)=3, W(2)=5, W(3)=3. Assume the shipping cost is 0. Two models may be considered: (1) Jointly optimize pricing and allocation decisions; (2) Sequentially optimize pricing and allocation decisions, which first optimize prices to maximize revenue, assuming any demand will be shipped as soon as it is ready, and then optimizes allocation to minimize cost. For example, in period 2, the pricing decision of the cargo characterized by (t=2, l=0) will be different. In model (2), there is 1 unit of cargo characterized by (t=1, l=1) ready to ship in that period, thus at most 2 units of capacity left to accept the quote ready to ship instantly, characterized by (t=2, l=0). Therefore, model (2) sets p(2,0)=2 and q (2,0)=1. On the other hand, model (1) jointly considers pricing and scheduling, and is flexible to ship q(1,1) and q(2,0) either in the current period or the next one. Therefore, model (1) sets p(2,0)=1 and q (2,0)=3, and ship q(1,1) in period 3. As a result, model (1) generates a profit of 13, whereas model (2) generates a profit of 12. It shows the joint optimization model outperforms the sequential optimization model.

Figure 4:
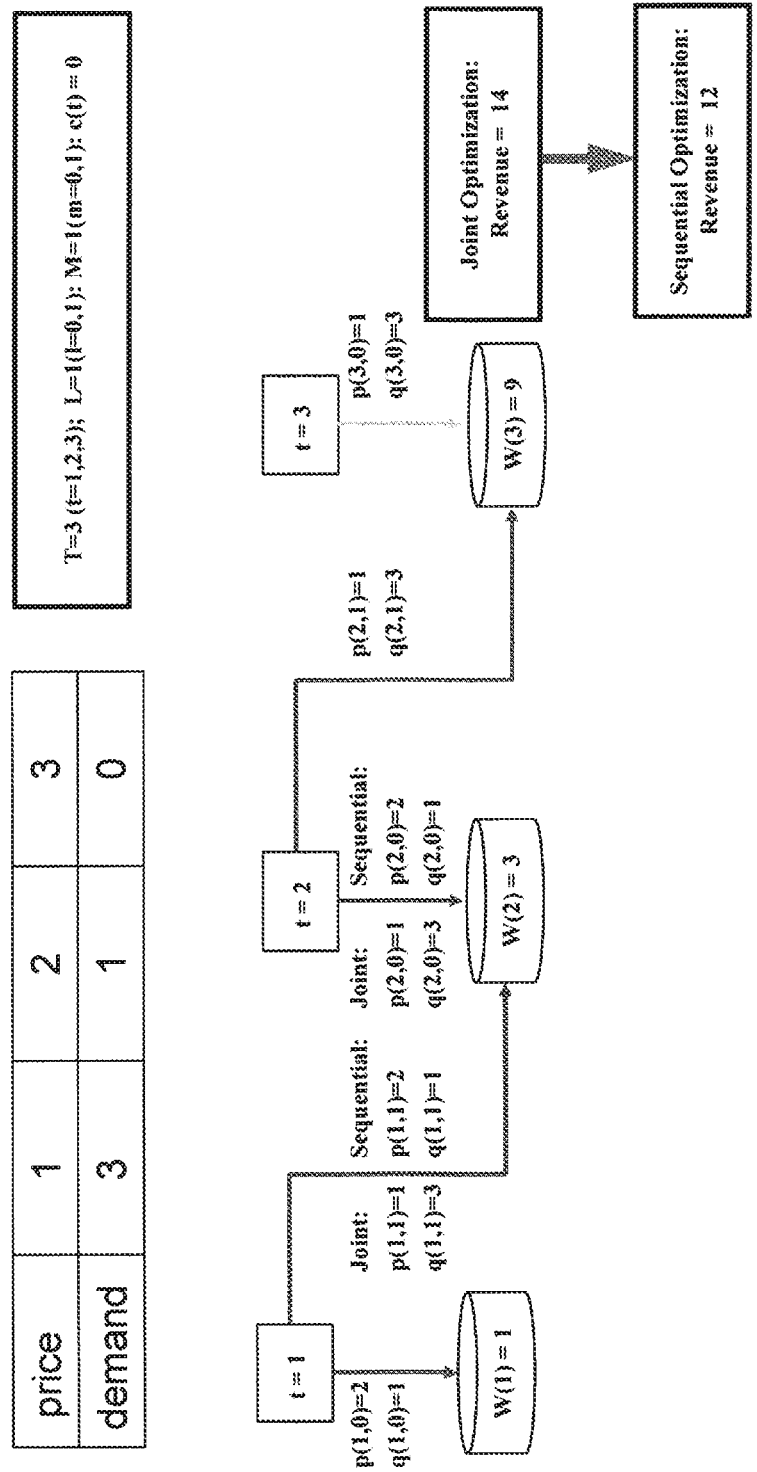
FIG. 4 shows another example of effects of capacity in one embodiment of the present disclosure.

FIG. 4 shows another example of effects of capacity in one embodiment of the present disclosure. In this example, the capacities include W(1)=1, W(2)=3, W(3)=9, which are less balanced across time. As in FIG. 3, two models are considered. A sequential optimization model generates a profit of 12, no more than that of the example shown in FIG. 3. However, a joint optimization model generates a profit of 14, even more than the example shown in FIG. 3. It shows the joint optimization is able to achieve capacity pooling and thereby generate more profit, particularly with unbalanced capacities over time.

Parameters in the dynamic program may include:

t: 1, . . . , T. Time index with planning horizon=T;

l: 0, . . . , L. Ready-to-ship date=t+l;

m: 0, . . . , M. Feasible ship time=t+l+m≤t+l+M, which is the latest date to ship;

p(t,l): continuous price decisions;

q(t,l): ship probability for a possible quote specified by (t,l) at price p(t,l), with a shipping quantity Q(t,l)=Λq(t,l), where Λ is the quoted quantity;

$y_m(t,l)$: 0-1 for allocation decision, =1 if quote (t,l) is planned to ship at t+l+m;

d(t,l,m)=$y_m(t,l)$·Q(t,l), shipping demand associated with allocation decision;

D(t)=$\Sigma_{0 \leq m \leq M} \Sigma_{\tau+l+m=t} y_m(\tau,l)$·Q(τ,l), total shipping quantities in period t after allocation decision;

$\hat{W}(t)$: Maximum capacity in period t (weight or volume).

The following formulation describes inventory status.

Available capacity in period t+k, before allocation decision in period t:

$U_t$ (k)=$\Sigma_{\tau+l+M=t+k, \tau<t}(\tau,l,M)$, minimum quantities to be shipped before t+k, at the beginning of period t, for k=0, . . . , T−t;

$\hat{W}_t$ (k)=$\max_{0 \leq k \leq T-t} \{\Sigma_{0 \leq \kappa \leq k} U_t(\kappa) - \Sigma_{0 \leq \kappa \leq k} \hat{W}(t+\kappa)\}$, maximum idle capacities at period t+k, for k=0, . . . , T−t.

In one embodiment, the minimum quantity to ship may be calculated by assuming that all the items would be shipped as late as possible. Therefore it will leave the maximum capacity available to accept new quotes and requests.

Available capacity after demand realization and capacity allocation:

Maximum quantity shipped in period t, in a simple example, assuming all items can be infinitely split in shipping, D(t)=min $\{\Sigma_{0 \leq \tau+l \leq t} d(\tau,l,M), \hat{W}(t)\}$. If there is a batch size constraint in shipping, an algorithm such as knapsack program may be applied to determine $y_m(\tau,l)$, for any τ+l+m=t;

$U_{t+1}$ (k)=$\Sigma_{\tau+l+M=(t+1)+k, \tau<(t+1)} d(\tau,l,M) - D(t)$, minimum quantities to be shipped before t+k, at the beginning of period t+1;

$\hat{W}_{t+1}$ (k)=$\max_{0 \leq k \leq T-(t+1)} \{\Sigma_{0 \leq \kappa \leq k} U_{t+1}(\kappa) - \Sigma_{0 \leq \kappa \leq k} \hat{W}(t+1+\kappa)\}$, maximum idle capacities at period (t+1)+k, for k=0, . . . , T−(t+1).

In one embodiment, to calculate the minimum quantity to ship in the next period t+1, assume the freight company ships as many quantities as possible after the scheduling decision in period t. Correspondingly, the maximum idle capacities are calculated as in $\hat{W}_{t+1}$(k).

A dynamic program calculates the total expected profit $G_t(U_t,W_t)$ in a recursive manner from period t to T, where $U_t=\{U_t(1), \ldots, U_t(M)\}$ and $W_t=\{W_t(1), \ldots, W_t(M)\}$ are the vectors.

$$G_t(U_t,W_t) = \max_{p(t,l),y_m(t,l)} E\{p(t,l)Q(t,l) - c(t)D(t) + \beta G_{t+1}(U_{t+1},W_{t+1})\} \quad \text{Eq. (3)}$$

In the dynamic program, the decision variables include the price and allocation decisions in period t. The first term calculates the expected revenue; the second term calculates the shipping costs associated with the allocation decision; the third term shows the expected profit from period t+1 to T.

Combining scheduling to pricing improves capacity utilization to match different service requirements and enables pricing differentiation for various service requirements such as lead time and shipping time window. In one embodiment, ready to ship date and latest ship date are determined only at the time of the request for quote or service, for example, by jointly pricing the cargo and scheduling the shipping time based on the request. In this way pricing is not disconnected of capacity scheduling and considers the benefit from optimal scheduling. For example, in one aspect, pricing may be optimized with capacity scheduling of airline or other transportation cargos.

Figure 5:
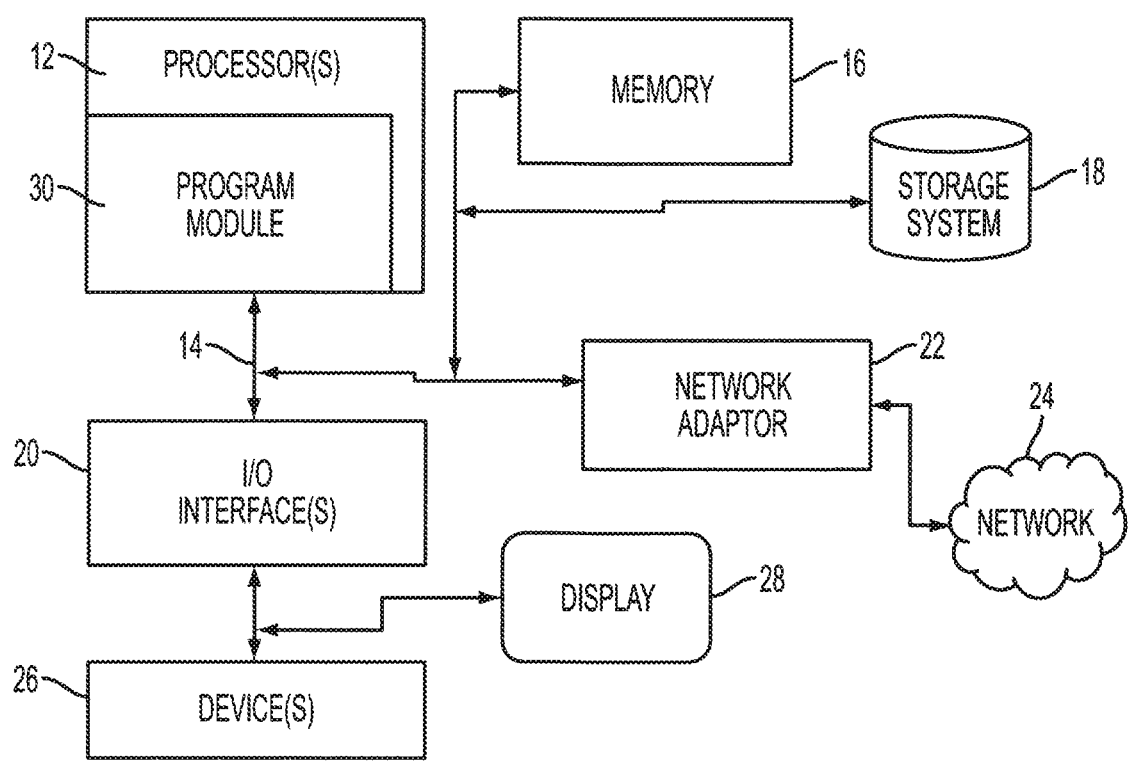
FIG. 5 illustrates a schematic of an example computer or processing system that may implement a logistics service system in one embodiment of the present disclosure.

FIG. 5 illustrates a schematic of an example computer or processing system that may implement a logistics service system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for cargo logistics, the method performed by at least one hardware processor, the method comprising:
   receiving a service request for transporting cargo;
   predicting a future demand for cargo services with a confidence level;
   responsive to determining that the confidence level meets a threshold confidence level, executing a mixed integer program that jointly determines price and shipping schedule for transporting the cargo, based on inputs comprising the demand forecast, customer data, cargo characteristics, service request, network capacity and existing cargos to ship, the mixed integer program optimizing jointly the price and the shipping schedule;

responsive to determining that the confidence level does not meet the threshold confidence level, executing a dynamic program that dynamically determines the price and the shipping schedule based on input comprising the demand forecast, the customer data, the cargo characteristics, the service request, the network capacity and the existing cargos to ship; and generating and transmitting a signal that dispatches the cargo for transportation according to the shipping schedule, wherein the mixed integer program and the dynamic program are two different optimization programs, one executed over the other depending on whether or not the confidence level associated with the predicted future demand for cargo services meets the threshold confidence level.

2. The method of claim 1, further comprising presenting the price and the shipping schedule via a user interface, wherein the generating is performed responsive to receiving an acceptance of the price and the shipping schedule via the user interface.

3. The method of claim 1, wherein decision variables in the mixed integer program comprises:

$x_n(t,l)$ comprising a binary value representing a pricing decision, wherein the pricing decision=1 if $p(t,l)$ is applied to a quote at period t, ready to ship at period t+l; and $y_m(t,l)$ comprising a binary value representing an allocation decision, wherein the allocation decision=1 if demand $Q(t,l)$ is planned to ship at period t+l+m;

wherein t=1, ..., T representing time index with planning horizon=T, l=0, ..., L representing ready-to-ship period=t+l, n=1, ..., N representing index of price point, and m=0, ..., M representing ship time=t+l+m≤t+l+M, t+l+M representing latest time to ship.

4. The method of claim 3, wherein the mixed integer program is solved subject to constraints comprising: only one of N list prices is selected in each period t ready to ship at t+l; a shipping demand after scheduling is jointly determined by the pricing decision and the allocation decision; only one of M time slots is selected; that total shipping demands does not exceed available capacity W(t) in each period t; and the pricing decision and the allocation decision variables are binary integers, specifying a list price to select and a shipping time slot to allocate.

5. The method of claim 1, wherein the dynamic program calculates a total expected profit $G_t(U_t, W_t)$ in a recursive manner from period t to T, wherein decision variables in the dynamic program comprises $p(t,l)$ representing continuous price decisions and $y_m(t,l)$ comprising a binary value representing an allocation decision wherein $y_m(t,l)=1$ if quote (t,l) is planned to ship at t+l+m, wherein t=1, ..., T representing time index with planning horizon=T, l=0, ..., L representing ready-to-ship period=t+l, m=0, ..., M representing ship time=t+l+m≤t+l+M, t+l+M representing latest time to ship.

6. The method of claim 1, wherein the shipping schedule comprises ready to ship date and latest ship date.

7. A computer program product for providing cargo logistics, the computer program product comprising a computer readable storage medium having program instructions embodied therewith, wherein the computer readable storage medium is not a transitory signal per se, the program instructions readable by a device to cause the device to perform a method comprising:

receiving a service request for transporting cargo;

predicting a future demand for cargo services with a confidence level;

responsive to determining that the confidence level meets a threshold confidence level, executing a mixed integer program that jointly determines price and shipping schedule for transporting the cargo, based on inputs comprising the demand forecast, customer data, cargo characteristics, service request, network capacity and existing cargos to ship, the mixed integer program optimizing jointly the price and the shipping schedule;

responsive to determining that the confidence level does not meet the threshold confidence level, executing a dynamic program that dynamically determines the price and the shipping schedule based on input comprising the demand forecast, the customer data, the cargo characteristics, the service request, the network capacity and the existing cargos to ship; and generating and transmitting a signal that dispatches the cargo for transportation according to the shipping schedule, wherein the mixed integer program and the dynamic program are two different optimization programs, one executed over the other depending on whether or not the confidence level associated with the predicted future demand for cargo services meets the threshold confidence level.

8. The computer program product of claim 7, further comprising presenting the price and the shipping schedule via a user interface, wherein the generating is performed responsive to receiving an acceptance of the price and the shipping schedule via the user interface.

9. The computer program product of claim 7, wherein decision variables in the mixed integer program comprises:

$x_n(t,l)$ comprising a binary value representing a pricing decision, wherein the pricing decision=1 if $p_n(t,l)$ is applied to a quote at period t, ready to ship at period t+l; and $y_m(t,l)$ comprising a binary value representing an allocation decision, wherein the allocation decision=1 if demand $Q(t,l)$ is planned to ship at period t+l+m;

wherein t=1, ..., T representing time index with planning horizon=T, l=0, ..., L representing ready-to-ship period=t+l, n=1, ..., N representing index of price point, and m=0, ..., M representing ship time=t+l+m≤t+l+M, t+l+M representing latest time to ship.

10. The computer program product of claim 9, wherein the mixed integer program is solved subject to constraints comprising: only one of N list prices is selected in each period t ready to ship at t+l; a shipping demand after scheduling is jointly determined by the pricing decision and the allocation decision; only one of M time slots is selected; that total shipping demands does not exceed available capacity W(t) in each period t; and the pricing decision and the allocation decision variables are binary integers, specifying a list price to select and a shipping time slot to allocate.

11. The computer program product of claim 7, wherein the dynamic program calculates a total expected profit $G_t(U_t, W_t)$ in a recursive manner from period t to T, wherein decision variables in the dynamic program comprises $p(t,l)$ representing continuous price decisions and $y_m(t,l)$ comprising a binary value representing an allocation decision wherein $y_m(t,l)=1$ if quote (t,l) is planned to ship at t+l+m, wherein t=1, ..., T representing time index with planning horizon=T, l=0, ..., L representing ready-to-ship period=t+l,
m=0, ..., M representing ship time=t+l+m≤t+l+M,
t+l+M representing latest time to ship.

12. The computer program product of claim 7, wherein the shipping schedule comprises ready to ship date and latest ship date.

13. A system of providing cargo logistics, comprising:
at least one hardware processor operable to receive a service request for transporting cargo,
the at least one hardware processor further operable to predict a future demand for cargo services with a confidence level,
responsive to determining that the confidence level meets a threshold confidence level, the at least one hardware processor further operable to execute a mixed integer program that jointly determines price and shipping schedule for transporting the cargo, based on inputs comprising the demand forecast, customer data, cargo characteristics, service request, network capacity and existing cargos to ship, the mixed integer program optimizing jointly the price and the shipping schedule,
responsive to determining that the confidence level does not meet the threshold confidence level, the at least one hardware processor further operable to execute a dynamic program that dynamically determines the price and the shipping schedule based on input comprising the demand forecast, the customer data, the cargo characteristics, the service request, the network capacity and the existing cargos to ship,
the at least one hardware processor further operable to generate and transmit a signal that dispatches the cargo for transportation according to the shipping schedule,
wherein the mixed integer program and the dynamic program are two different optimization programs, one executed over the other depending on whether or not the confidence level associated with the predicted future demand for cargo services meets the threshold confidence level.

14. The system of claim 13, wherein the at least one hardware processor is operable to execute a user interface that presents the price and the shipping schedule, wherein the at least one hardware processor generates the signal responsive to receiving an acceptance of the price and the shipping schedule via the user interface.

15. The system of claim 13, wherein decision variables in the mixed integer program comprises:
$x_n(t,l)$ comprising a binary value representing a pricing decision, wherein the pricing decision=1 if $p_n(t,l)$ is applied to a quote at period t, ready to ship at period t+l; and
$y_m(t,l)$ comprising a binary value representing an allocation decision, wherein the allocation decision=1 if demand Q(t,l) is planned to ship at period t+l+m;
wherein t=1, ..., T representing time index with planning horizon=T,
l=0, ..., L representing ready-to-ship period=t+l,
n=1, ..., N representing index of price point, and
m=0, ..., M−1 representing ship time=t+l+m≤t+l+M,
t+l+M representing latest time to ship.

16. The system of claim 15, wherein the mixed integer program is solved subject to constraints comprising: only one of N list prices is selected in each period t ready to ship at t+l; a shipping demand after scheduling is jointly determined by the pricing decision and the allocation decision; only one of M time slots is selected; that total shipping demands does not exceed available capacity W(t) in each period t; and the pricing decision and the allocation decision variables are binary integers, specifying a list price to select and a shipping time slot to allocate.

17. The system of claim 13, wherein the dynamic program calculates a total expected profit $G_t(U_t,W_t)$ in a recursive manner from period t to T, wherein decision variables in the dynamic program comprises p(t,l) representing continuous price decisions and $y_m(t,l)$ comprising a binary value representing an allocation decision wherein $y_m(t,l)$=1 if quote (t,l) is planned to ship at t+l+m, wherein
t=1, ..., T representing time index with planning horizon=T,
l=0, ..., L representing ready-to-ship period=t+l,
m=0, ..., M representing ship time=t+l+m≤t+l+M,
t+l+M representing latest time to ship.

18. The system of claim 13, wherein the shipping schedule comprises ready to ship date and latest ship date.

19. The method of claim 1, wherein the future demand for cargo services is predicted using a time series model that performs predictions with confidence values.

* * * * *